March 8, 1966 A. M. RENARD 3,239,832
BINARY TO ONE-OUT-OF-M DECIMAL DIGITAL DECODER
UTILIZING TRANSFORMER-COUPLED FIXED MEMORY
Filed April 16, 1962 2 Sheets-Sheet 1

INVENTOR
ANDRE M. RENARD
BY John R. Faulkner
John A. Duffy
ATTORNEYS

March 8, 1966 A. M. RENARD 3,239,832

BINARY TO ONE-OUT-OF-M DECIMAL DIGITAL DECODER UTILIZING TRANSFORMER-COUPLED FIXED MEMORY

Filed April 16, 1962 2 Sheets-Sheet 2

INVENTOR.
ANDRE M. RENARD
BY John R. Faulkner
John A. Duffy
ATTORNEYS

United States Patent Office 3,239,832

Patented Mar. 8, 1966

3,239,832

BINARY TO ONE-OUT-OF-M DECIMAL DIGITAL DECODER UTILIZING TRANSFORMER-COUPLED FIXED MEMORY

Andre M. Renard, Costa Mesa, Calif., assignor to Ford Motor Company, Dearborn, Mich., a corporation of Delaware Filed Apr. 16, 1962, Ser. No. 187,569
5 Claims. (Cl. 340—347)

This invention relates to decoders and more particularly to a circuit for converting a digital number stored in binary form to a digital number in decimal form by selecting one out of *m* possible outputs, each representative of a particular decimal number.

The conversion of data in binary form to decimal form is necessary in many applications such as on-the-line computers, plotters, and automatic data processing systems. In such devices, it is customary to convert a digital number, stored for example, in the flip flops of a binary counter, to an output representative of the decimal value of the digital number. The output then may be utilized in a readout device to indicate the digital number. Precision, stability, accuracy, sampling rate and response time are important properties desired in decoders.

Most of the binary decimal decoders in the art involve methods of interconnecting resistor and diode circuits in a voltage divider network. Such decoders customarily employ logical circuitry having active components and which limit the speed of operation in addition to being inefficient and expensive. Accordingly, it is an object of this invention to provide an improved decoder.

The decoder of this invention contemplates as a material feature thereof a converter circuit in which an air coupled transformer circuit is utilized as a fixed memory wherein induced voltages representing binary digits are summed and sensed to appropriately energize an output representative of the value of a digital number. The device employs many entirely passive components, thereby greatly increasing the speed of response, in addition the simplicity and efficiency of operation.

It is therefore another object of the invention to provide a decoder of high speed capability.

It is a further object of the invention to provide a decoder employing mainly passive components.

It is a still further object of the invention to provide a decoder utilizing a transformer circuit in which induced voltages representative of a digital number are summed and sensed to energize an output representative of the digital number.

Figure 1:
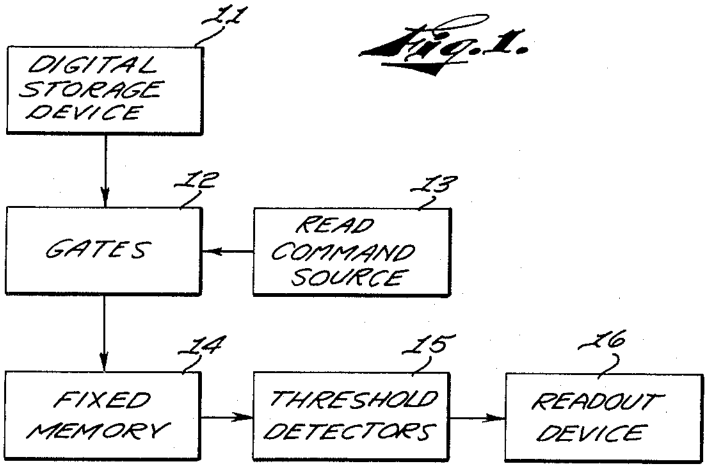
Figure 2:
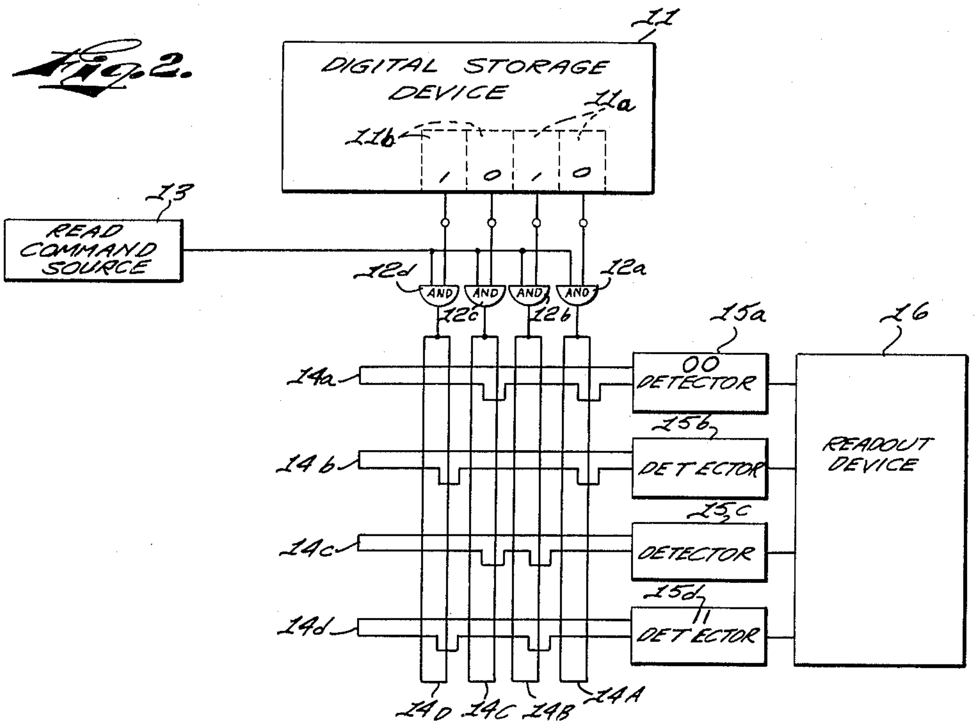
Figure 3:
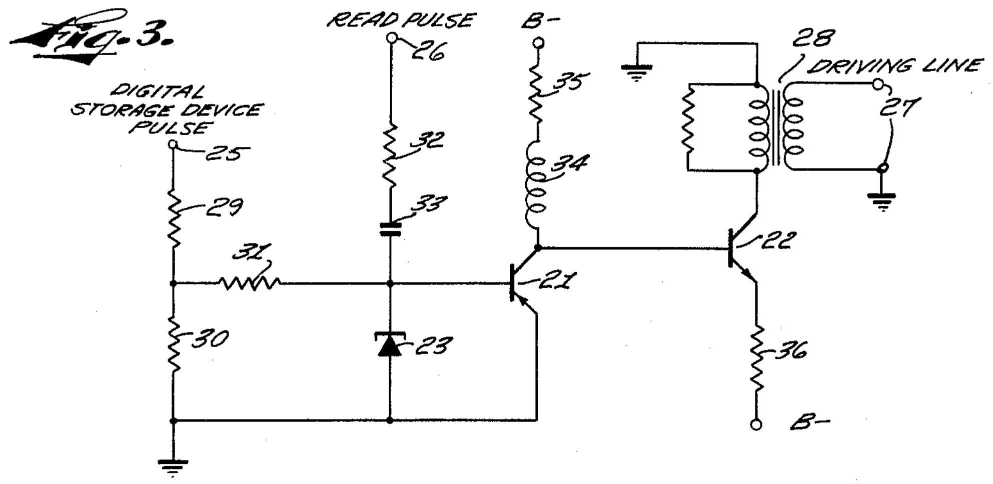
Figure 4:
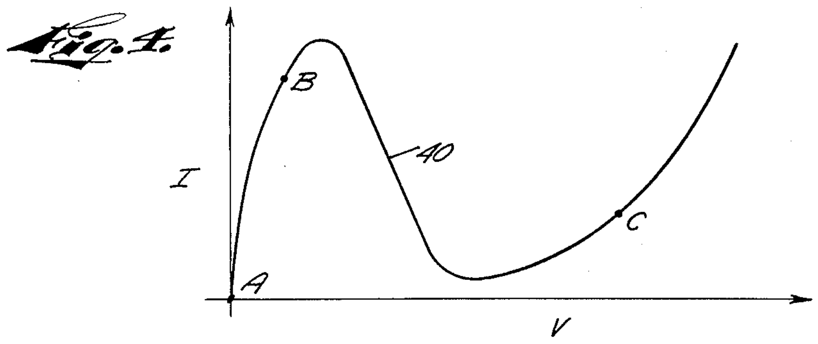
Figure 5:
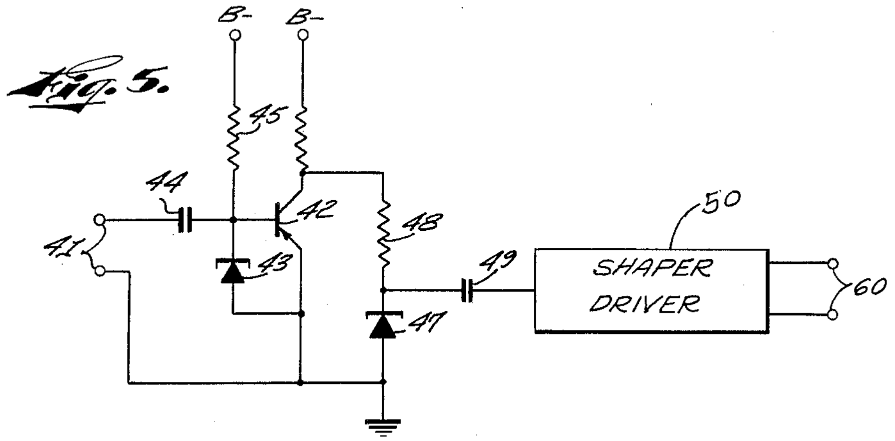

Other objects of invention may be better understood by reference to the drawings taken with the description, in which:

FIG. 1 is a block diagram illustrating the principles of the decoder of the invention, FIG. 2 is a schematic block diagram illustrating the preferred embodiment of the decoder of the invention, FIG. 3 is a schematic diagram illustrating the gates utilized in the device of the invention, FIG. 4 is a characteristic curve of the tunnel diodes utilized in the gate circuit of FIG. 3, and FIG. 5 is a preferred embodiment of the threshold detector utilized in the device of FIG. 2.

According to a principal aspect of the invention, a decoder is provided in which a plurality of bistable devices arranged as a binary counter store a number in digital form. A fixed memory comprising a transformer circuit has a plurality of driving lines responsive to the output of the bistable devices to provide pulses indicative of the digital numbers stored in the bistable devices and a plurality of sense lines coupled to the driving lines which have voltages induced therein by the driving lines corresponding to the output of the bistable devices. The sense line corresponding to the digital number stored has induced therein a voltage having a magnitude greater than a predetermined threshold and greater than the magnitude of the voltages induced in the remaining sense lines. A threshold detector corresponding to the sense line detects the maximum magnitude of voltage and provides a signal to a readout device.

Referring now to FIG. 1, a block diagram illustrating the principles of the invention, a digital storage device 11, which may comprise a plurality of flip flops cascaded to provide a binary counter, stores the digital number to be decoded. Coincidence between a control signal from a read command source 13 and an output from one of the flip flops of the storage device 11 indicating the state of the flip flops causes gates 12 to open corresponding to the output from the flip flops of storage device 11. An electrical pulse corresponding to the state of the flip flop is fed to a fixed memory 14. The memory 14 receives pulses from the gates 12 on driving lines indicative of the state of the binary digits of the digital number to be converted. A plurality of sense lines in the memory 14 coupled to the driving lines have voltages induced therein by the driving lines. The sense line corresponding to the digital number stored in the device 11 receives a voltage of greater magnitude than the remaining sense lines which is sensed by a corresponding detector in threshold detectors 15. The voltage thus fed to the corresponding detector in the threshold detectors 15 represents the value of the digital number stored in the storage device 11. A readout device 16 indicates the digital number stored in the device 11.

Referring now to FIG. 2, a schematic diagram of the preferred embodiment of the invention, the storage device 11 may comprise a binary counter having for example two stages including flip flops 11*a* and 11*b*, each having a pair of outputs denoted as binary zero and binary one. A pair of AND gates corresponding to each of the flip flops are provided with AND gates 12*a* and 12*b* responsive respectively to the zero and one digits of flip flop 11*a* and AND gates 12*c* and 12*d* respectively responsive to the zero and one digits of flip flop 11*b*. The gates 12 are connected to receive a pulse from the read command source 13 as a second input, and deliver a pulse at their outputs upon coincidence with a signal from the storage device 11. Each of the outputs of the gates 12 has a corresponding driving line which forms a part of the fixed memory 14. For example, the driving line 14A is connected to be responsive to the output of the AND gate 12*a* and propagates a pulse therein upon receipt of a pulse from the AND gate 12*a* indicative of the binary 0 state of the flip flop 11*a*. The driving lines 14 are coupled to corresponding sense lines to provide the fixed memory 14. Each of the sense lines is selectively coupled to the driving lines whereby a unique coupling code for each sense line corresponds to a digital number stored in the device 11. For example, the sense line 14*a* is coupled to the driving lines 14A and 14C indicative of the binary number 00.

The sense lines may be coupled to the driving lines in any convenient manner well known in the transformer art whereby a voltage in a driving line causes the induction of a corresponding voltage in a coupled sense line. A transformer coupling arrangement may be utilized, for example, by the magnetic coupling through a core of the sense and driving windings.

Each of the sense lines is fixedly coupled to a predetermined number of driving lines to represent a unique digital number. The sense line indicative of the digital number stored in the device 11 will be coupled to all of the driving lines receiving pulses from the gates 12. Only one sense line will be coupled to all of the driving lines and therefore one sense line will have a cumulative voltage induced therein by the driving lines which is greater than the voltage induced in the other sense lines.

In the example shown in FIG. 2, the fixed memory 14 has four driving lines, 14A through 14D, selectively coupled to four sense lines 14*a* to 14*d*. Each of the sense lines corresponds to a possible number stored in the flip flops 11*a* and 11*b*.

Each of the sense lines of the fixed memory 14 is responsively coupled to a detector of the threshold detectors 15. Detector 15*a*, for example, is representative of a digital number 00 stored in the flip flops 11*a* and 11*b*. Each of the detectors 15 is adapted to provide an output pulse when voltages are induced by the driving lines into all of the sense lines coupled thereto. For example, a detector 15*a* will provide an output pulse when the driving lines 14A and 14C both induce voltages in the sense line 14*a*. Thus, it is readily apparent that one and one only of the detectors 15 presents an output pulse indicative of the digital number stored in the storage device 11. A readout device 16 responsive to the detectors 15 reads out the digital number stored in the storage device 11.

Referring now to FIG. 3, there is shown a schematic diagram illustrating a typical gate of the gates 12 in FIG. 2, a terminal 25 is connected to be responsive to one of the outputs of the bistable devices of the digital storage device 11. A switching circuit including a tunnel diode 23 is responsive to the pulse at the input terminal 25 fed through the resistor divider network of resistors 29, 30, and 31, and a pulse from the read command source 13 fed into the terminal 26 and applied to the cathode terminal of the tunnel diode 23 through a resistor 32 and a capacitor 33. The tunnel diode 23 is initially biased to be in its zero state and is switched to the bias point of the low impedance region by the arrival of a pulse from either the read command source 13 or the digital storage device 11. Upon coincidence between pulses from both the source 13 and the device 11 the diode 23 is switched to its high impedance region. Upon the switching of the tunnel diode 23 a transistor driving circuit including the transistors 21 and 22 is activated providing an output pulse across the terminals 27. The transistor 21 is normally off and caused to conduct upon the switching of the tunnel diode 23 to its high impedance region. The output of the transistor 21 is then coupled to the transistor 22 which amplifies the signal presented, and a voltage is coupled from a transformer 28 at the output of the transistor 22 across the output terminals 27.

The gate of FIG. 3 delivers a narrow pulse across the output terminals 27 which is directly connected to a driving line of the fixed memory 14. High speed of operation is realized because of the inherently fast switching characteristics of the tunnel diode 23. As shown in FIG. 4, a typical tunnel diode characteristic, the tunnel diode 23 switches from the zero region at A to the high impedance region at B upon receipt of a pulse from either the terminal 25 or 26. Coincidence of pulses at the terminals 25 and 26 causes the diode 23 to switch from A to B to C, the low impedance region thereby completing the AND gate action.

Referring now to FIG. 5, there is shown a schematic diagram of the preferred embodiment of a detector of the threshold detectors 15. In FIG. 5, the input terminals 41 are responsive to the output of a predetermined one of the sense lines of the fixed memory 14. The pulse from the sense line is coupled from the terminals 41 through a capacitor 44 to the cathode of a tunnel diode 43. The tunnel diode 43 is biased by the resistor 45 to be normally in the zero region which causes the transistor 42 to be normally cut off.

Upon receipt of a voltage from the terminals 41 the diode 43 is switched according to the wave form illustrated in FIG. 4. If the voltage from the terminals 41 is of any value below the predetermined maximum value which is established when all of the driving lines propagating a pulse are coupled to the sense line connected to terminals 41, the diode 43 will approach the point B on the characteristic but will not go beyond. If the voltage received at the terminals 41 is of the maximum value, then the diode 43 is switched beyond the point B to the low impedance region C. Thus, it may be seen that the diode 43 is operating as a threshold detector switching only when the predetermined maximum value of voltage is received at the terminals 41.

Switching of the tunnel diode 43 causes conduction in a transistor 42 whose output is coupled through resistor 48, diode 47, and capacitor 49 to the input of a shaper driver 50. Output terminals 60 present a shaped and amplified pulse which is fed to the readout device 16 of FIG. 2.

In operation of the digital to analog converter as illustrated in FIG. 2, it will be assumed for illustration purposes that the digital storage device 11 is storing the number 11 in binary form. Upon receipt of a pulse from the command source 13 the AND gates 12*b* and 12*d* open because of receiving pulses from the flip flops 11*a* and 11*b*. The driving lines 14B and 14D propagate pulses inducing corresponding voltages of a 2 magnitude in the sense line 14*d*. The sense line 14*a* has no voltage induced therein and the sense lines 14*b* and 14*c* have a voltage of a 1 magnitude induced therein. Since the sense line 14*d* is the only sense line having voltages coupled from both the driving lines 12*b* and 12*d*, the voltage at the sense line 14*d* is of the magnitude 2. The threshold detectors 15, set to operate only at the voltage magnitude of 2, detect the digital number stored in the storage device 11 by reason of the fact that the detector 15*d* corresponding to the digital number 11 is the only detector receiving a voltage of the magnitude 2. The detector 15*d* then provides an output to the readout device 16 which indicates the number 11 in decimal form.

The speed and efficiency of operation of the decoder of the invention are greatly enhanced by the utilization of passive components utilized in the fixed memory with coupling of the drive lines of the sense lines. The fixed memory 14 may be conveniently fabricated by a conventional printed circuit technique and may comprise, for example, an analog card which is a two layer printed circuit having the driving lines on one layer and the sense lines on the other layer. The sense lines may be selectively coupled to the drive lines by simply making a loop of the sense lines tightly around the driving lines.

The advantages of the decoder of this invention are readily apparent. Simplicity, speed of operation, and overall efficiency are realized by the use of the passive circuitry therein. For example, in a practical application, the time between receipt of a pulse from the read command source 13 and the receipt of an input pulse by one of the detectors 15 is seven manoseconds.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. In a data processing system having a device for storing digital numbers, a pair of drive lines for each bit of said digital number responsively connected to said storage device to propagate electrical pulses indicative of the state of said corresponding bit, a plurality of sense lines corresponding to all possible states of said digital storage device, means for coupling energy from said drive lines to said sense lines to induce a voltage of highest magnitude in the sense line corresponding to the number stored in said storage device, and means for detecting said highest magnitude voltage.

2. The combination recited in claim 1 wherein said means for coupling said sense lines to said drive lines comprises a magnetically coupled transformer.

3. In a device for decoding binary numbers, a storage device having a plurality of bistable devices for storing a binary number, a pair of drive lines for each said bistable device to indicate the state of said bistable device, means for propagating pulses in said drive lines indicative of the states of said bistable devices, a sense line for each said drive line, means for coupling energy from said sense lines to said drive lines so as to induce from said drive lines a voltage in said sense line indicative of a pulse in said corresponding drive line, the magnitude of voltage in each said sense line being indicative of the number of drive lines propagating a pulse therein, and a threshold detector for each said sense line to detect a predetermined magnitude of voltage in said corresponding sense line.

4. The combination recited in claim 3 wherein said sense lines are air coupled to said drive lines.

5. In a data processing system having a plurality of flip flops for storing a digital number, each of said flip flop having a pair of output circuits for indicating the state of said flip flops, a pair of gates for each said flip flop responsively connected to the output circuits of said flip flops, a source of read command signals for controlling the opening of each gate in accordance with the state of said flip flops, whereby one of a pair of gates corresponding to a pair of output circuits of a flip flop will open indicative of the state of said corresponding flip flop, storage means responsive to the output of said gates for storing said digital number, said storage means comprising a driving line at the output circuit of each said gate for propagating a pulse when said corresponding gate is open, a sense line for each said driving line, means for selectively coupling said sense lines to said driving lines according to a predetermined manner comprising transformer coupled lines such that the the sense line correspoding to the digital number stored in said storage means has induced therein voltages from all of the driving lines connected to the open gates and propagates a pulse of greater magnitude than pulses propagated by the other sense lines, a plurality of threshold detectors corresponding to and responsively connected to receive the outputs of said sense lines, and a readout device responsive to said threshold detectors for indicating the digital number stored in said flip flop comprises the transformer coupling of selected sense lines about selected drive lines.

References Cited by the Examiner

UNITED STATES PATENTS

| | | | |
|---|---|---|---|
| 2,782,399 | 2/1957 | Rajchman | 340—174 |
| 2,846,671 | 8/1958 | Yetter | 340—347 |
| 3,096,449 | 7/1963 | Stucki | 307—88.5 |

MALCOLM A. MORRISON, *Primary Examiner.*